April 2, 1940.   T. J. REED   2,195,938
TURBINE
Filed Aug. 22, 1939   2 Sheets-Sheet 1

T.J.Reed
INVENTOR
BY *Victor J. Evans & Co.*
ATTORNEYS

April 2, 1940.                    T. J. REED                    2,195,938
                                   TURBINE
                            Filed Aug. 22, 1939            2 Sheets-Sheet 2
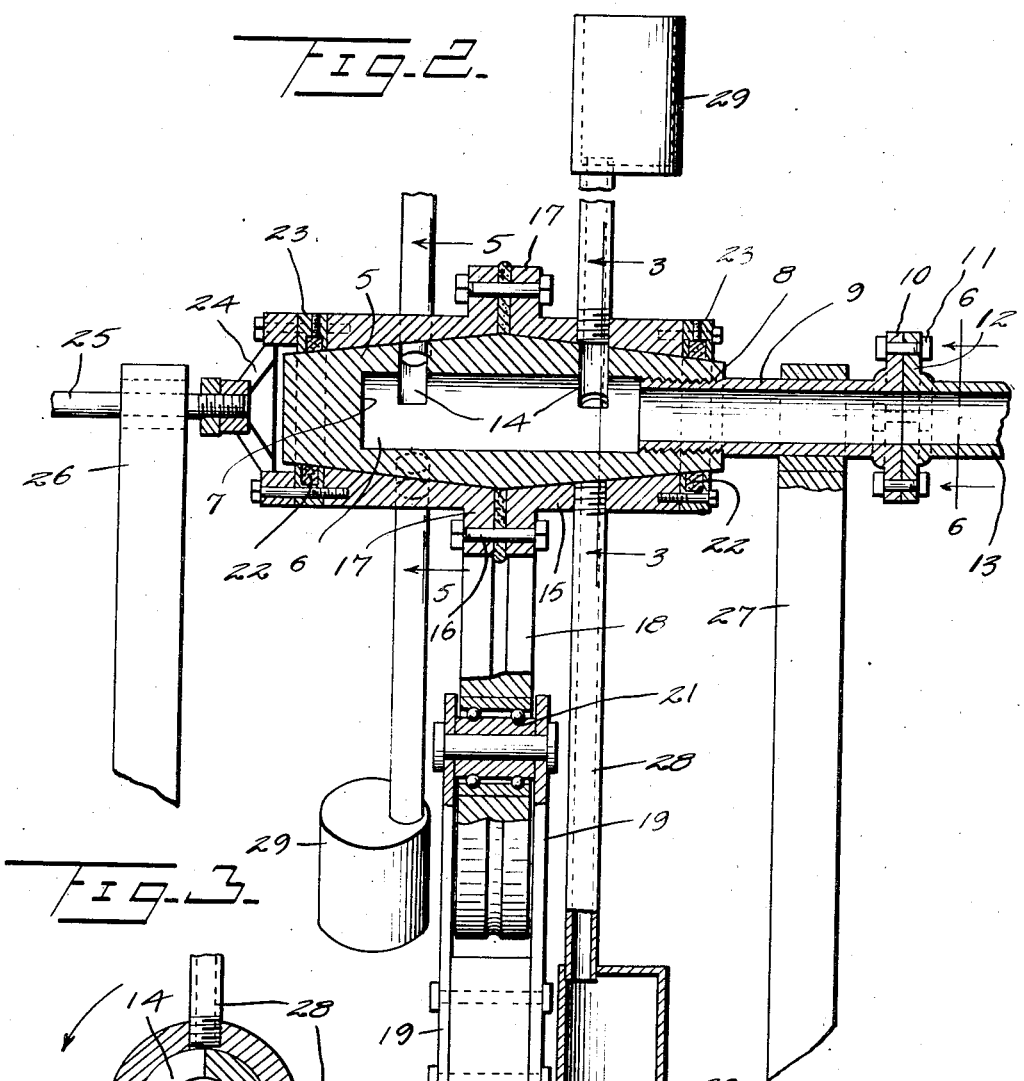
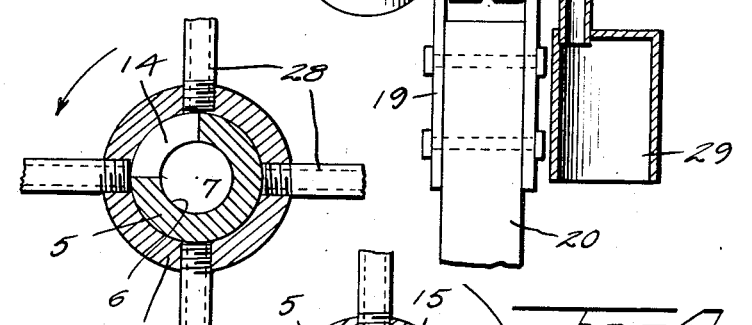
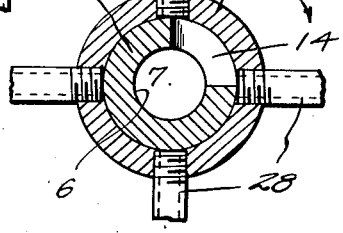
T. J. Reed
INVENTOR
BY Victor J. Evans & Co.
ATTORNEYS Patented Apr. 2, 1940

2,195,938

UNITED STATES PATENT OFFICE 2,195,938

TURBINE

Thomas J. Reed, Gulfport, Miss.

Application August 22, 1939, Serial No. 291,420

1 Claim. (Cl. 253—34)

My invention relates to water turbines and has as one of the principal objects thereof the provision of a water turbine of an improved construction and which is comparatively simple in operation, durable in use, and inexpensive in manufacture.

Another object of my invention is to provide a turbine of the above described character capable of being connected to any convenient source of water supply and which requires a minimum amount of water for the operation thereof.

Other objects and advantages will be apparent from the following description, appended claim and annexed drawings.

Referring to the drawings wherein like reference characters designate like parts throughout the several views:

Figure 2 is a sectional view taken on the line 2—2 of Figure 1.

Figure 3 is a sectional view taken on the line 3—3 of Figure 2.

Figure 4 is a sectional view similar to Figure 3 but illustrating the stator as arranged for operating the rotor in a reverse direction.

Figure 1:
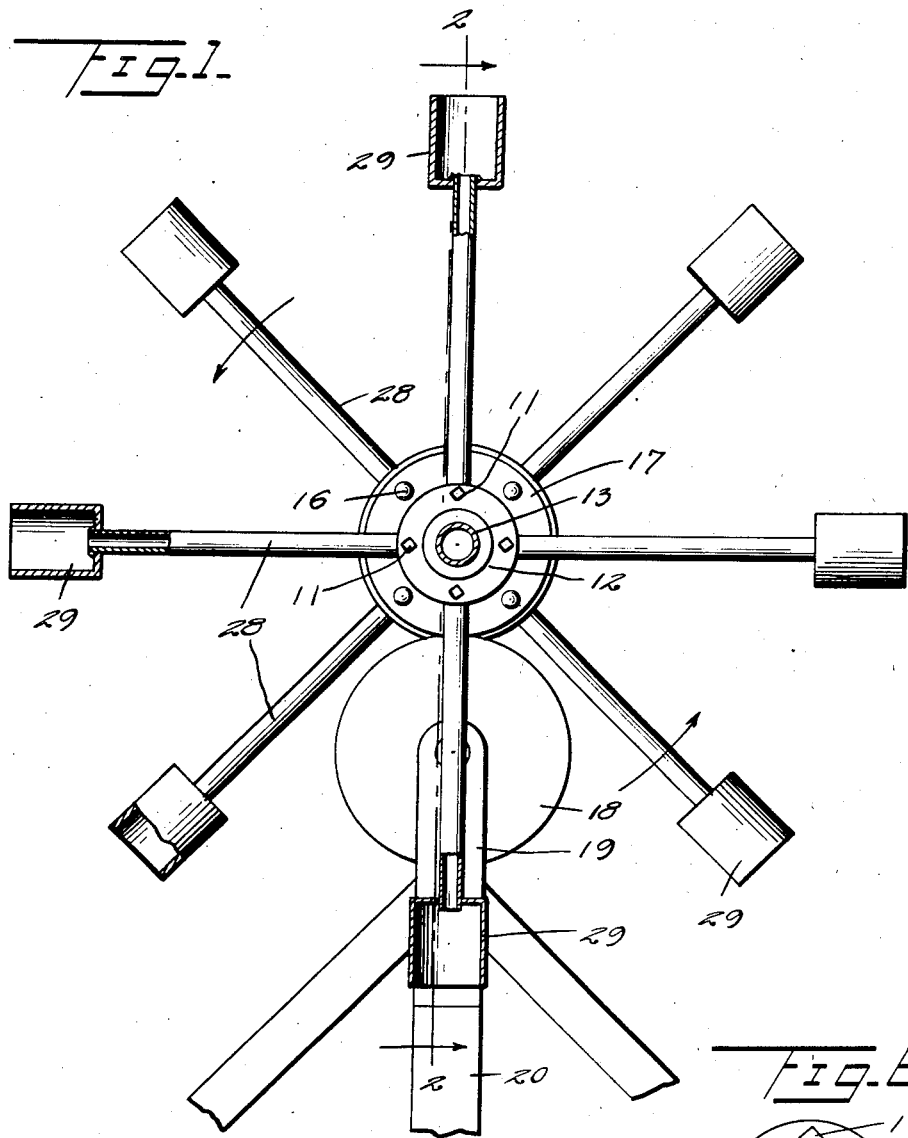
Figure 1 is an end elevation of my invention, partly in section.
Figure 6:
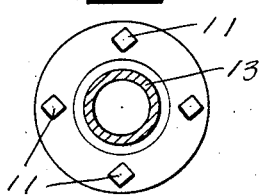
Figure 5:
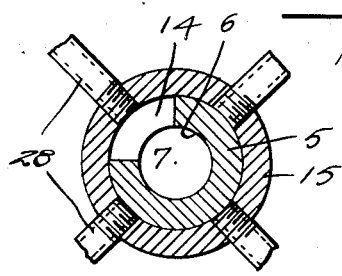

Figures 5 and 6 are detail sectional views taken on the lines 5—5 and 6—6 of Figure 2 respectively.

In practicing my invention I provide a stator or stationary axle 5, the outer surface of which tapers from the transverse center thereof to its ends and said axle is fashioned with a longitudinally disposed cul-de-sac 6 having closed and open ends 7 and 8 respectively, the latter being threadedly connected to the inner end of a sleeve 9. The outer end of the sleeve is fashioned with a flange 10 connected by bolts 11 to a similar flange 12 formed on the end of a water supply conduit 13 whereby water is supplied to the interior or cul-de-sac of the stator 5. The stator is provided at opposite sides of its transverse center with water outlet ports 14 and which are arranged on one side and above the axis thereof.

Rotatably mounted on the stator is a rotor or hub 15, the latter comprising a pair of similar sections which are connected together by bolts 16 passing through flanges 17 formed on the inner ends of the sections. A gasket is mounted between the flanges of the hub sections and said flanges rest upon a supporting wheel 18 rotatably mounted between the arms 19 of a stationary support 20 through the medium of a roller bearing assembly 21. The outer ends of the hub have bolted thereon collars 23 formed in their inner peripheral faces with grooves in which are contained packing rings 22 to preclude leakage of water from the ports 14 between the outer peripheral face of the axle and the inner peripheral face of the hub.

One of the heads 23 is provided with a spider 24, the hub of which is fixed to a drive shaft 25 rotatably mounted in a stationary support 26. A similar stationary support 27 supports the sleeve 9 as clearly illustrated in Figure 2 of the drawings. The sections of the hub have extending therethrough, the inner ends of a plurality of radially extending tubes or pipes 28 communicating with the cul-de-sac 6 through the medium of the bolts 11. The outer ends of the tubes 28 have attached thereto cylindrical-shaped receptacles 29 having open outer ends whereby water is discharged from the tubes.

In operation, water is introduced into the cul-de-sac 6 through the medium of the conduit 13 and discharges from said cul-de-sac through the ports 14 into the tubes 28 as the tubes successively communicate with said ports 14. It will be noted that due to the ports 14 being arranged to one side of the stator, the water is discharged into the successively rotated tubes as each rotates past the vertical center of the stator and the weight of said water causes continued rotation of the rotor, it being understood that the water is gradually discharged as the tubes are moved downwardly.

From the foregoing it will be apparent that I have provided a simple and efficient water turbine by which any suitable mechanism may be driven upon connection with the drive shaft 25. Furthermore, a reverse movement of the rotor may be had by rotating the stator approximately 90° to position the ports on the opposite side thereof.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

A device of the character described, comprising, a stator formed with a cul-de-sac adapted for communication with a water supply and with outlet ports communicating with said cul-de-sac, a hub rotatably mounted on said stator, a plurality of radially extending tubes carried by said hub for progressive registry with said ports for receiving water from said cul-de-sac to effect rotation of said hub, means connected to said hub for transmitting rotation therefrom, said hub having a pair of separable sections formed with connected flanges, and a support wheel engaging said flanges and supporting said hub during rotation thereof.

THOMAS J. REED.